(12) United States Patent
Haslam et al.

(10) Patent No.: US 12,339,991 B1
(45) Date of Patent: Jun. 24, 2025

(54) DATA PROTECTION SYSTEMS AND METHODS

(71) Applicant: United Services Automobile Association (USAA), San Antonio, TX (US)

(72) Inventors: Justin Dax Haslam, San Antonio, TX (US); Jose L. Romero, Jr., San Antonio, TX (US); Arthur Quentin Smith, Fredericksburg, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 293 days.

(21) Appl. No.: 17/677,707

(22) Filed: Feb. 22, 2022

Related U.S. Application Data

(60) Provisional application No. 63/153,648, filed on Feb. 25, 2021.

(51) Int. Cl.
G06F 21/62 (2013.01)

(52) U.S. Cl.
CPC ................................ *G06F 21/6245* (2013.01)

(58) Field of Classification Search
CPC .................................................. G06F 21/6245
See application file for complete search history.

(56) References Cited

U.S. PATENT DOCUMENTS

| | | | | |
|---|---|---|---|---|
| 10,002,639 | B1 * | 6/2018 | Gaeta | G10L 21/00 |
| 10,181,178 | B2 * | 1/2019 | Cutler | H04N 7/142 |
| 10,503,935 | B1 * | 12/2019 | Hadsall | G06F 21/32 |
| 10,719,592 | B1 * | 7/2020 | Nichols | G10L 17/06 |
| 2007/0103552 | A1 * | 5/2007 | Patel | H04N 5/913 |
| | | | | 348/203 |
| 2010/0097341 | A1 * | 4/2010 | Iwayama | G06V 40/30 |
| | | | | 345/173 |
| 2011/0300806 | A1 * | 12/2011 | Lindahl | G10L 21/0208 |
| | | | | 455/63.1 |
| 2016/0246996 | A1 * | 8/2016 | Khoo | G06F 16/00 |
| 2018/0082068 | A1 * | 3/2018 | Lancioni | G06F 21/84 |
| 2018/0152667 | A1 * | 5/2018 | Taine | G06T 7/11 |
| 2018/0218163 | A1 * | 8/2018 | Ananthapur Bache | |
| | | | | G06F 21/84 |
| 2019/0087889 | A1 * | 3/2019 | Rice | G06Q 30/0643 |
| 2019/0377901 | A1 * | 12/2019 | Balzer | H04L 63/0421 |
| 2019/0384941 | A1 * | 12/2019 | Anderson | G06F 21/32 |
| 2020/0175961 | A1 * | 6/2020 | Thomson | G10L 15/28 |
| 2020/0184080 | A1 * | 6/2020 | Trim | G06F 21/84 |
| 2020/0219235 | A1 * | 7/2020 | Xie | G06V 30/413 |
| 2020/0242260 | A1 * | 7/2020 | Chen | G06F 21/62 |
| 2020/0252478 | A1 * | 8/2020 | Dukellis | G06F 16/9014 |
| 2021/0149441 | A1 * | 5/2021 | Bartscherer | G06F 1/1616 |

(Continued)

*Primary Examiner* — Darshan I Dhruv
(74) *Attorney, Agent, or Firm* — FLETCHER YODER P.C.

(57) ABSTRACT

Provided is a data protection system that operates to shield private data from detection or communication over a network. In an embodiment, the system includes a shielding device that, when active, provides a shielding output that shields, e.g., obscures, detection of private data by sensors of smart devices. The shielding may be selectively activated such that active sensors of the smart devices may operate or detect environmental events normally during times outside of the shielding. A data protection tool of the system may remove or shield private data generated by a user device, e.g., by modifying captured image data.

15 Claims, 7 Drawing Sheets

(56) References Cited

U.S. PATENT DOCUMENTS

| | | | |
|---|---|---|---|
| 2021/0232673 A1* | 7/2021 | Athlur | G06F 21/82 |
| 2022/0156038 A1* | 5/2022 | Chilakamarthy Venkata | G06F 3/167 |
| 2022/0180008 A1* | 6/2022 | Trim | G02B 27/0172 |

* cited by examiner

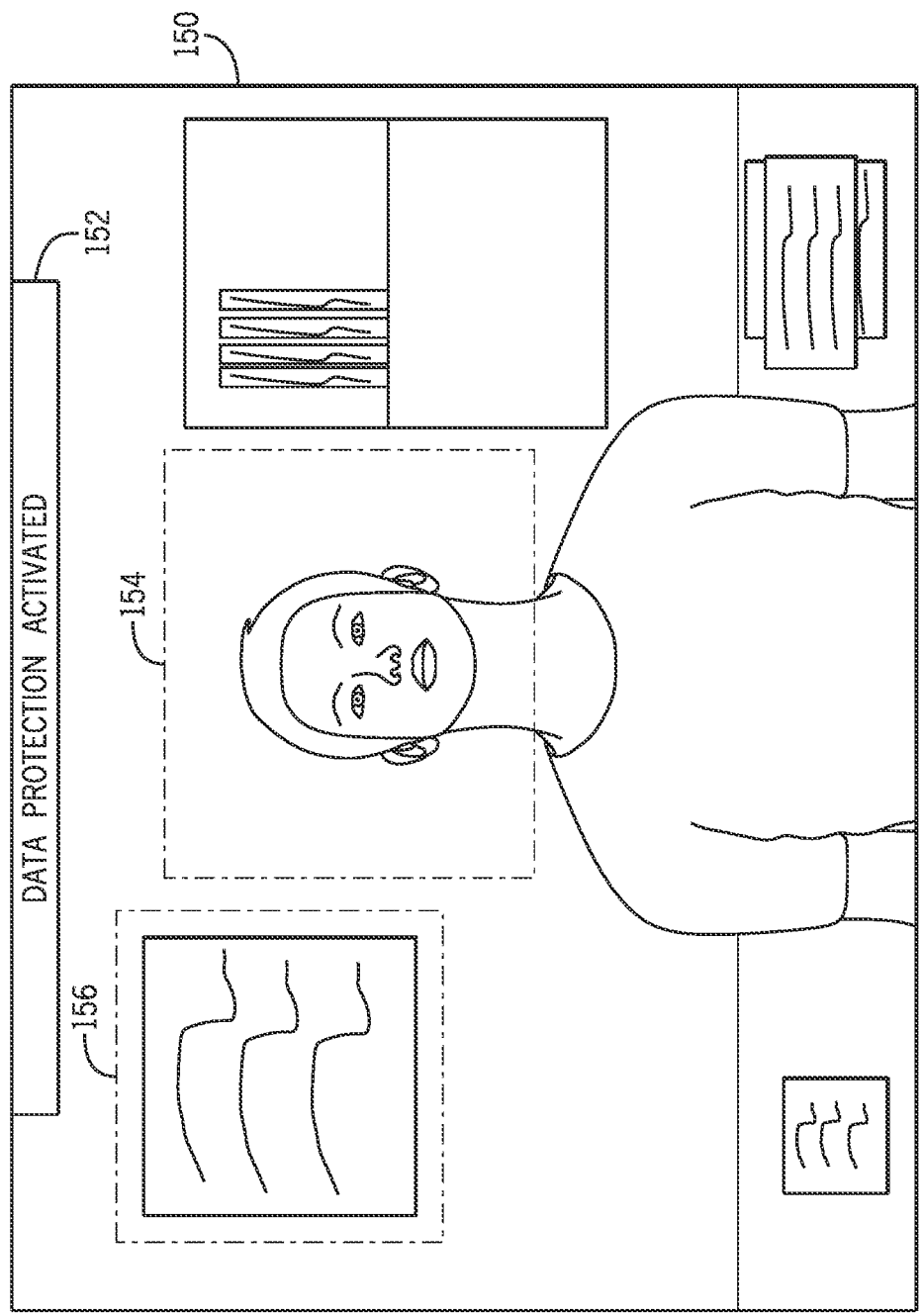

DATA PROTECTION SYSTEMS AND METHODS

CROSS-REFERENCE TO RELATED APPLICATION

The present application claims benefit of and priority to U.S. Provisional Patent Application Ser. No. 63/153,648, titled "Data Protection System and Methods," which was filed on Feb. 25, 2021, and which is herein incorporated by reference in its entirety for all purposes.

BACKGROUND

The present disclosure relates generally to techniques for preventing unauthorized or inadvertent private data capture. More specifically, the present disclosure relates to techniques to mask, shield, or obscure private data to prevent unauthorized or inadvertent capture and/or techniques to deactivate or deter data capturing devices.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

As users incorporate more and more smart devices into their homes and workplaces, the data privacy risks of having internet-connected devices in such private spaces is of concern. For example, users are often concerned that smart devices are recording conversations in the background and in a manner that is not detectable by the user. In response to emerging privacy concerns, improved data security and privacy solutions are needed.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a data protection system to selectively shield private data from a smart device may include a user device configured to receive input from a user to generate private data. The system may also include a smart device comprising a sensor configured to detect environmental data in an environment of the sensor and generate a sensor signal; and a shielding device, the shielding device comprising a controller that controls activation of a shielding output in response to a signal from the user device that the private data is being generated.

In one embodiment, a data protection system to selectively shield private data from a smart device may include a user device configured to receive input from a user to generate private data; a smart device comprising a sensor; and a shielding device coupled to the user device, the shielding device comprising a controller that emits a signal to the smart device in response to an input at the user device that the private data is being generated, wherein the smart device deactivates the sensor in response to receiving the signal.

In one embodiment, a data protection system to selectively shield private data may include a user device configured to receive camera data from a camera of the user device during operation of a communication application. The system may also include a data protection tool configured to: receive the image data; identify private data in the image data; modify the image data to shield the private data; and provide the modified image data to the communication application to be displayed.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

DRAWINGS

These and other features, aspects, and advantages of the present disclosure will become better understood when the following detailed description is read with reference to the accompanying drawings in which like characters represent like parts throughout the drawings, wherein:

FIG. 7 illustrates an example of a modified private camera feed created using the data protection system of FIG. 1, in accordance with embodiments described herein.

DETAILED DESCRIPTION

Figure 1:
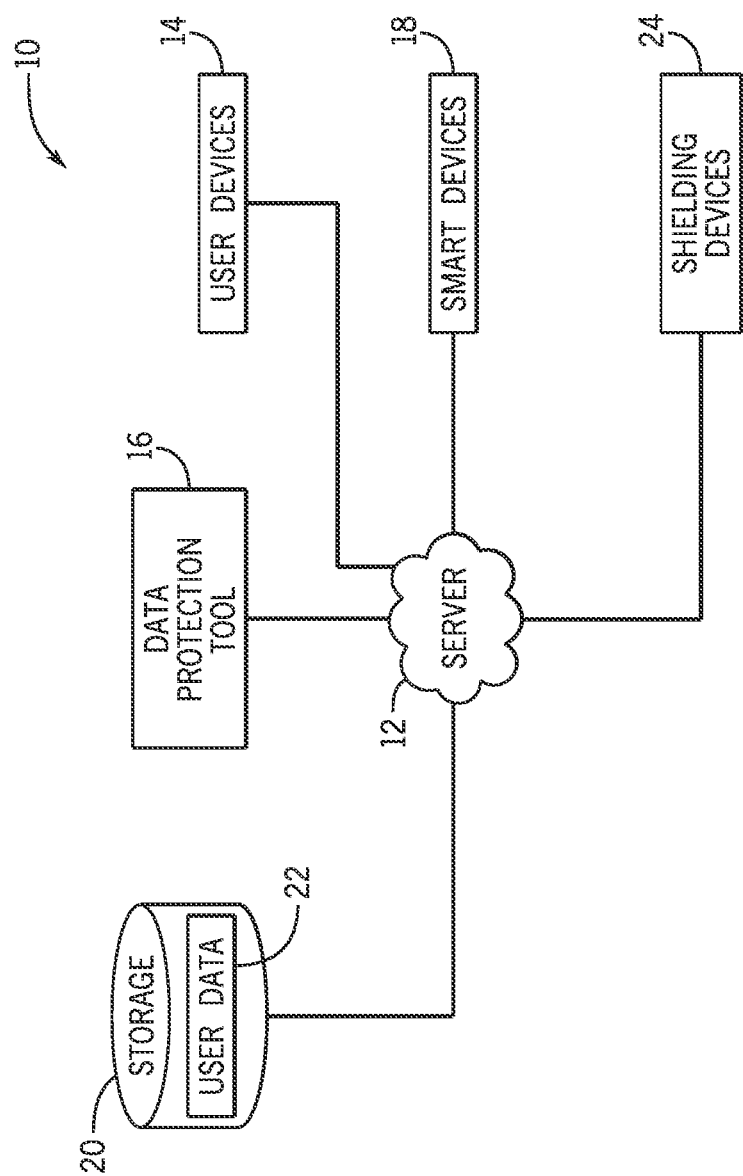
FIG. 1 illustrates a schematic diagram for a data protection system for private data, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions are made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Many smart devices are capable of recording ambient or surrounding audio around the devices. In some cases, these devices may automatically turn on based on misinterpreting a trigger phrase, word, or other sounds. Alternatively, it is unknown when some of these devices are recording or not. With more smart devices in use, people may wish to have the ability to have control over recording or sensor activity from smart devices for greater privacy.

Provided herein are data protection systems that include one or more shielding techniques that address privacy concerns in smart device to actively interfere with data gathering operations or sensed data quality of a sensor of a smart device (e.g., home, office, vehicle or other devices that have the ability to collect, store, process and transmit data, or various combination of these abilities). In one embodiment, a user device, such as a mobile device, tablet, or home computer, may be equipped with an emitter that emits a tone or signal to deactivate these devices when a call is initiated via the user's device. For example, when the headset is active on a user's device, the user's device may send a ping (audible or inaudible sound waves or other communication signal) to deactivate all other listening (or viewing) devices in the area until the call is finished.

In some embodiments, a noise generator may be positioned by (e.g., co-located with) a smart listening device that is capable of being activated by the user device such that the noise generator is activated when a user call is initiated. The noise generator may generate low volume sound waves within a close proximity of the listening device to obscure or scramble the audio detectable by the listening device. In another example, keyboard inputs to a user device may produce certain radio frequency signals or electronic signals that may be detectable using certain tracking devices or sensors. In some embodiments, the shielding may include a false keyboard signal generator incorporated into the user's device (or a standalone shielding device) to send false keyboard signals (e.g., different radio frequency signals) to distort any collected data. In an embodiment, the shielding may include visual shielding to obscure sensitive visual information. The shielding may be incorporated into standalone devices, as part of or coupled to a smart device, and/or integrated into or coupled to a user device.

With the foregoing in mind, in an embodiment, the passive or active data protection system may provide shielding, obscuring, or blocking of sensitive information, thus preventing capture by monitoring devices such as smart devices. In an embodiment, the data security and protection system may additionally or alternatively control deactivation of smart devices to prevent capture of sensitive information. The benefits of the disclosed techniques include, but are not limited to greater data security in home and/or work settings (in addition to school, church, public, retail shopping, settings, etc.).

FIG. 1 illustrates a diagram of a data protection system 10. The system 10 may include a server 12 (e.g., one or more servers of a cloud computing environment), user devices 14, a data protection tool 16, smart devices, storage 20, e.g., a database, where user data 22 may be stored, and, in an embodiment, shielding devices 24. The server 12, user devices 14, data protection tool 16, smart devices 18, user database 20, and shielding devices may communicate with each other, e.g., at least one other component of the system 10, using a variety of communication protocols. The communication protocols may include Open Database Connectivity (ODBC), TCP/IP Protocol, Distributed Relational Database Architecture (DRDA) protocol, Database Change Protocol (DCP), HTTP protocol, other suitable current or future protocols, or combinations thereof.

The server 12 may be a server operated by a third-party organization (e.g., a bank, an insurance company, or a financial group). For example, the server 12 may be a private server, such as local area network (LAN) that includes a variety of computing and server devices including, but are not limited to, switches, servers (e.g., processors), storage (e.g., memory) and routers. Further, the server 12 may be a cloud-based server. The server 12 may include restrictions and access rules established in order to relegate access to selected users (e.g., clients, employees, third party service providers, regulatory representatives). The organization may use the server 12 to provide a variety of services for the clients. In some embodiments, the server 12 may actually be off premises (e.g., in a cloud or the like). The server 12 may include service/application servers, data servers, databases, and other server devices such as gateways, switches and routers.

The data protection tool 16 may be accessed by a software application that is at least in part installed on the user device 14 (which may be a smart phone, smart wearable, or other mobile smart device) or as a web browser mediated application. The data protection tool 16 may also communicate with or be stored on the server 12 to carry out certain operations as provided herein.

Figure 2:
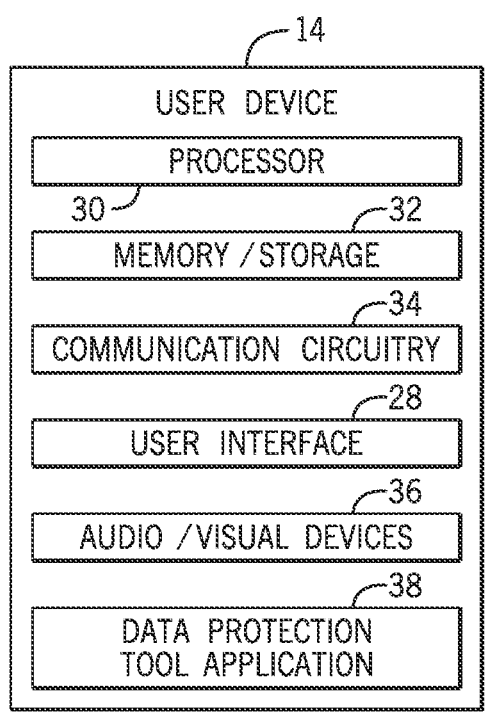
FIG. 2 illustrates a block diagram of a user device that may be used in the system of FIG. 1, in accordance with embodiments described herein.

FIG. 2 is a block diagram of an embodiment of a user device 14 of the system 10. A user may access and/or interact with the data protection tool 16 operating on the user device 14 via a user interface 28, such as a graphical user interface (GUI) or via an audio command interface that facilitates interaction (e.g., audio user inputs, audio device feedback) with the user device 14. A user device 14 may include various types of components that may assist the user device 14 in performing various types of computing tasks and operations. For example, a user device 14 may be any electronic device comprising at least a processor 30, a memory 32, a communication circuitry 34, a user interface 28, audio/visual devices 36 (speaker, microphone, camera), or any combination thereof. Further, it should be understood that certain components of the user device 14 depicted in FIG. 2, such as the processor 30, the memory 32, the communication circuitry 34, the user interface 28, and audio/visual devices 36 may be present in other components of the system 10.

The processor 30 of the user device 14 may be any type of computer processor or microprocessor capable of executing computer-executable code. The processor 30 may also include multiple processors that may perform the operations described below.

The memory 32 component may be any suitable articles of manufacture that can serve as media to store processor-executable code, data, or the like. These articles of manufacture may represent computer-readable media (e.g., any suitable form of memory or storage) that may store the processor-executable code used by the processor 30 to perform the presently disclosed techniques. It should be noted that non-transitory merely indicates that the media is tangible and not a signal.

The data protection tool 16 may, in an embodiment, be downloaded and stored in the memory 32 of the user device 14 or may be stored at least in part on the server 12 and accessed via the user device 14. As used herein, applications, e.g., the data protection tool 16, may include any suitable computer software application or program that may be installed as a data protection tool application 38 onto the user device 14 and executed by one or more processors 30 of user device 14 to access a remote data protection tool 16.

The user device 14 may comprise a communication circuitry 34 that may be configured to communicate with a server 12. The communication circuitry 34 may facilitate communication between the user device 14 and the server 12 via the Internet, or the like. The communication may include private data of the user, such as passwords, alphanumeric pins, photos, documents, audio or video data, user inputs to user devices, or outputs of the user devices 14 (e.g., displayed information or stored information on the user device 14).

The user device 14 may also operate to display the user interface 28 and permit user actions, such as user input, to the user interface 28. Along with displaying the user interface 28, the user device may also present the same information that is presented via graphic, as described above, through an audio output component 36.

Figure 3:
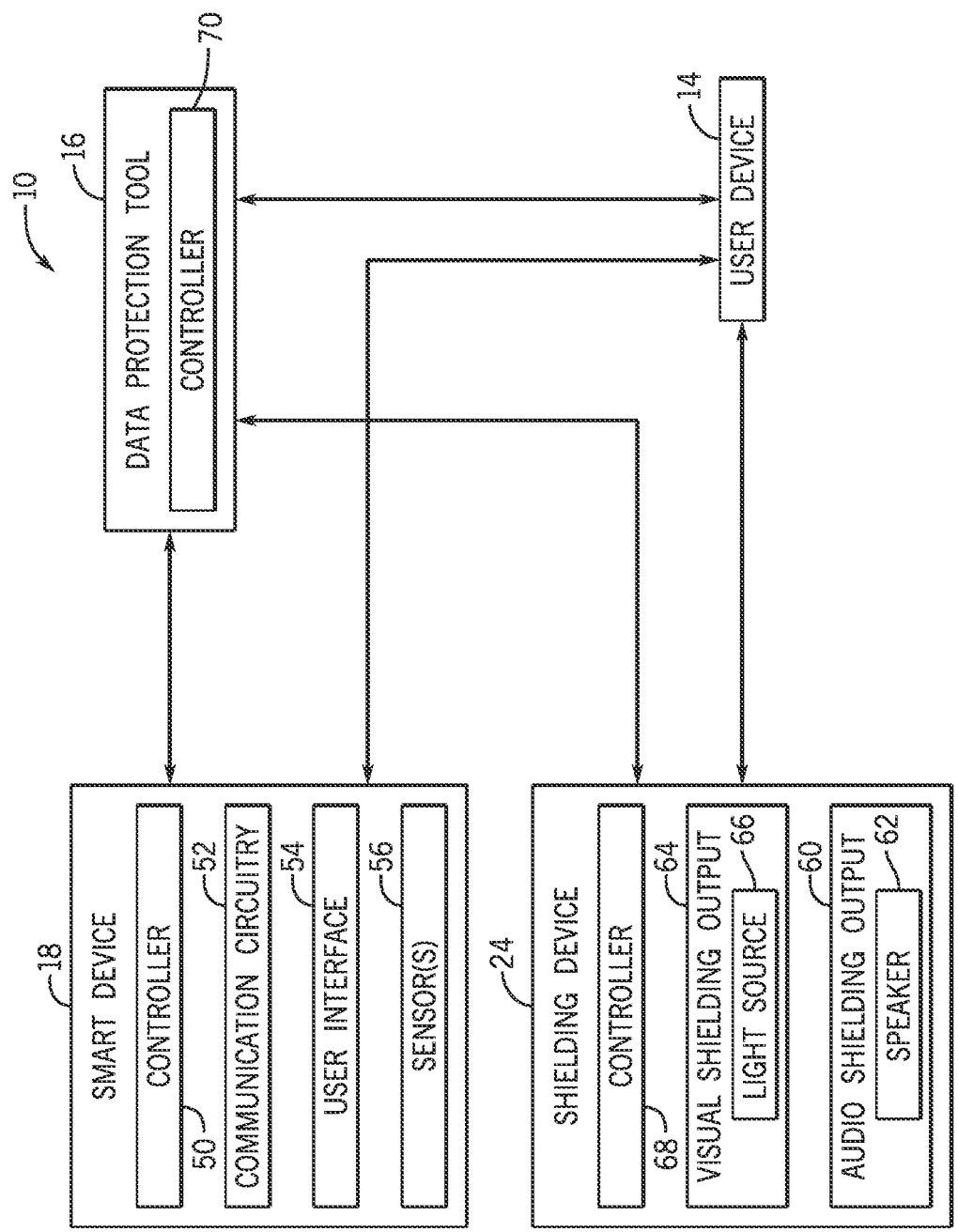
FIG. 3 illustrates a block diagram of a components of the system of FIG. 1, in accordance with embodiments described herein.

FIG. 3 is a block diagram showing communication pathways between devices of the system 10 to selectively shield or protect personal data. While certain features (a processor 30, a memory 32, a communication circuitry 34, a user interface 28, audio input/output 36) are discussed in conjunction with the user device 14, it should be understood that similar features may be present in the other devices of the system 10, such as the smart device 18, a device or devices operating the data protection tool 16, and/or the shielding device 24.

For example, the smart device 18 may include a controller 50 that operates under processor control to execute instructions stored in a memory. The smart device 18 is communicatively coupled to other devices or networks via communication circuitry 52 and may include a user interface 54 to adjust operation features. The smart device includes one or more sensors 56, which may include audio sensors (i.e., to sense environmental sound), video sensors (to acquire image data of the environment), temperature sensors, motion sensors, pressure sensors, radiofrequency sensors, etc. Based on the detected signals from the one or more sensors 56, the smart devices 18 may activate certain features. Smart devices 18 may include security systems, such as doorbell camera monitoring or interior monitoring, smart thermostats, personal assistant devices, devices incorporated into home appliances (e.g. refrigerator interfaces), and/or home medical devices. The smart device 18 operates to capture environmental data that may include private or personal data. In an embodiment, the sensor 56 of the smart device 18 is always on (passively monitoring and engaging) or is set by default in an active sensing mode. The smart device 18 may be in communication with a central controller or server and may pass information on to a third party.

In one example, the smart device 18 is a smart assistant, such as an Alexa or Siri device, that has an active audio sensor that, upon detection of a trigger word, is activated to start using voice input from the audio sensor to trigger additional actions. However, as provided herein, a user of the data protection system 10 may wish to avoid having the sensor 56 capture data during family conversations, work telephone conferences, etc. In particular, the user may wish to prevent private data from being communicated to a third party, e.g., a vendor of the smart device 18. In addition, certain types of sound data, such as passcode or pin entries, keyboard entries, may be used to identify the user input associated with private password or other input data.

To limit the ability of the sensor 56 of the smart device 18 to capture sound data, the system 10 may include a shielding device 24 that, when activated, emits noise or other signals to shield private data. An audio shielding output 60 of the shielding device 24 may include a speaker 62 or other emitter that disrupts or distorts sound detected at the sensor 56 of the smart device 18. For example, the audio shielding output 60 may include a directed ambient sound generator (Lidar) that produces directional sound to protect sensitive information, e.g., private data. In another example, the audio shielding output may generate white noise (see FIG. 4) emitted towards the smart device 18 to overwhelm any data generated in the environment of the smart device 18. Thus, while the smart device 18 can continue to generate signals from its sensor 56, the signals, when communicated to a central server, will not be resolvable.

In another example, the shielding device may additionally or alternatively include a visual shielding output. In an embodiment, the output 64 comprises a light source 66. In one example, the light source 66 is a directional strobe employed to provide a visual obstruction or deterrent from viewing an electronic display of a user device 14 or other private data when private data is presented. Other types of shielding output are also encompassed within the data protection system 10, including electromagnetic emission outputs that include an emitter in the electromagnetic spectrum that is activated as provided herein to shield private data. Further, as discussed herein, the system 10 may cause selective deactivation of the sensor 56 to protect private data. The shielding device 24 includes a controller 68 that operates to selectively activate the shielding (e.g., the visual shielding output 64 and/or the audio shielding output 60) based on instructions from the system 10. For example, the controller 68 may operate to drive hardware components, such as the speaker 62 or an electromagnetic emitter (e.g., the light source 66) based on instructions received from the user device 14, which in turn may generate the instructions based on operations of the data protection tool 16. The shielding device is near (e.g., within 1 meter, within 3 meters, within 5 meters) or co-located with the smart device 18 and operates to prevent the smart device 18 from detecting resolvable data from which private data can be extracted. Activation of the shielding may be controlled by rules-based logic of the data protection tool 16, or through machine learning based models, or using empirical data involving the user(s).

The data protection tool 16 may include a controller 70 that operates under processor control to execute instructions stored in a memory to control selective activation of features of the system 10. The data protection tool 16 may cause the user device 14 to communicate instructions to the smart device 18 to deactivate the sensor 56 or may communicate directly with the smart device 18 to control deactivation. The data protection tool 16 may cause the user device 14 to communicate instructions to the shielding device 24 to activate one or more shielding outputs or may communicate directly with the shielding device 24 to control activation. In another example, the user device 14 may be equipped with an emitter that emits a tone or signal to deactivate these devices when a call is initiated via the user's device.

In one example, the system 10 activates the shielding device 24 or deactivation of the sensor 56 based on a detected trigger word or indication that sensitive data is going to be spoken. For example, the user device 14 detects a word or phrase, e.g., using a microphone. The word or phrase is passed to the data protection tool 16, which determines that the word or phrase is a deactivating phrase. In another example, the system 10 causes deactivation of the sensor 56 and/or activates shielding based on the status of a particular application of the user device. For example, when a headset (e.g., a coupled audio/visual device 36 of the user device 14) is detected as being coupled to and/or active on the users device 14, the system 10 may cause the user device 14 may send a ping to deactivate sensors 56 of any smart devices 18 in the area until the call is finished and/or to activate the audio shielding output 60. These data protection measures may also be automatically deactivated when the headset is detected by the system 10 as inactive or uncoupled. Thus, the user device 14 may pass information to the data protection tool 16 indicative of the status of open or active applications or coupled devices.

In addition, data protection may be activated based in detected inputs to the user device 14. The user's device 14 may detect when provided data is about to be entered and then protect the subsequent private data as the data is entered. The identification of private data may involve machine learning/AI. The identification process may also be used in conjunction with a call and verbal signals (reps asks "what is your social security number?") that may be used to identify when sensitive data is about to be typed. For example, if a digit is typed, subsequent entered data is very likely to be the social security number (tax id, credit card number, passcode, etc.).

Figure 4:
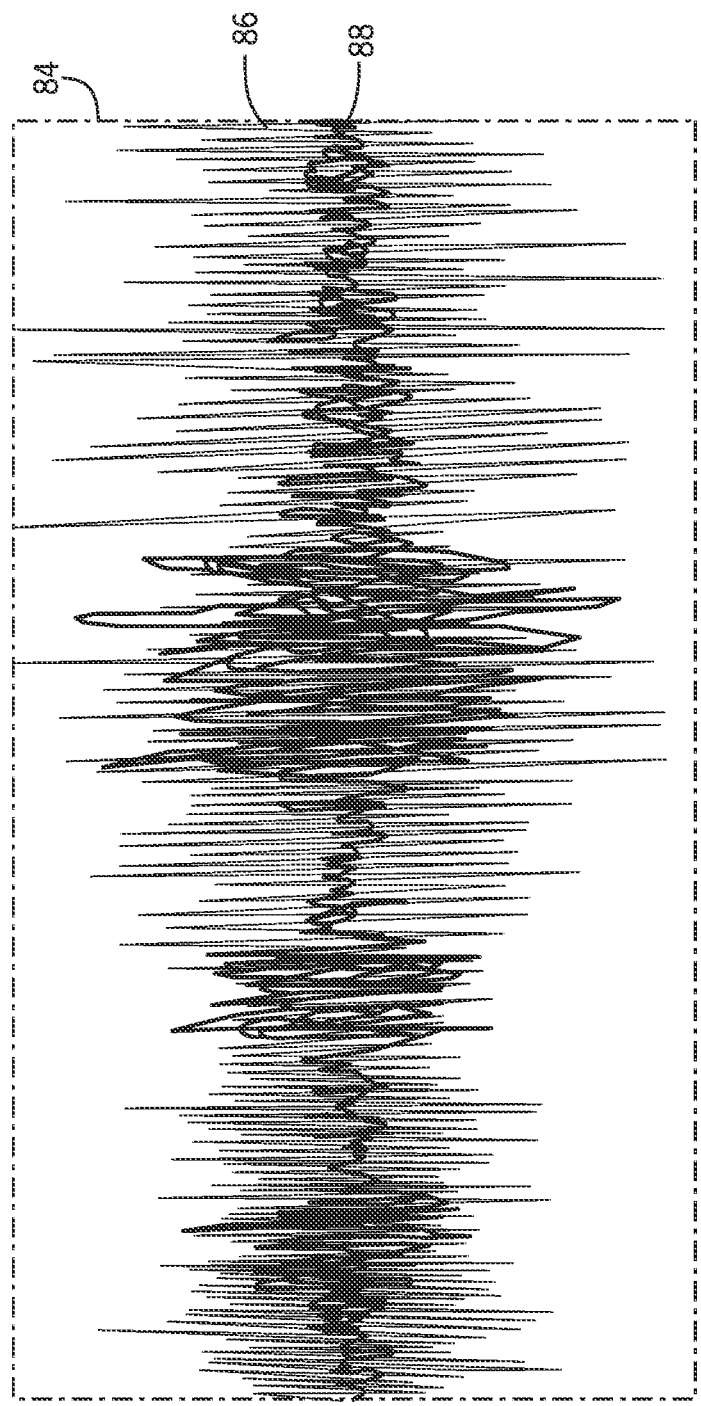
FIG. 4 illustrates an example of shielded audio data, in accordance with embodiments described herein.

FIG. 4 shows an example detected sensor signal 84, such as a sensor signal generated from the sensor 56. In the depicted embodiment, the sensor 56 is a microphone or acoustic sensor, and the detected sensor signal 84 includes a white noise generator 86 and a private data component 88. The private data component 88 is shielded by the white noise component such that the private data component 88, representative of private noise data (spoken words, keypad entries) is not resolvable from the detected sensor signal 84. Thus, the system 10 may operate with smart devices 18 that are off-the-shelf and not necessarily compatible or able to communicate with other components of the system 10. By positioning the shielding device 24 next to or near the smart device 18, the smart device 18 operating normally in an active sensing mode is unable to detect private data because of the interfering sound emitted by the shielding device 24. While the depicted embodiment discusses emitted white noise, other types of noise shielding are also contemplated. For example, the activate shielding device 24 may be activated to emit different types or levels of interfering sound depending on the nature of the private data being generated. In an embodiment, the operation of the smart device 18 is not altered or controlled by the system 10 as part of data protection. That is, the selective activation of the data protection of the system 10 is mediated by the control of the shielding device 24 to distort the incoming data to the smart device 18.

Figure 5:
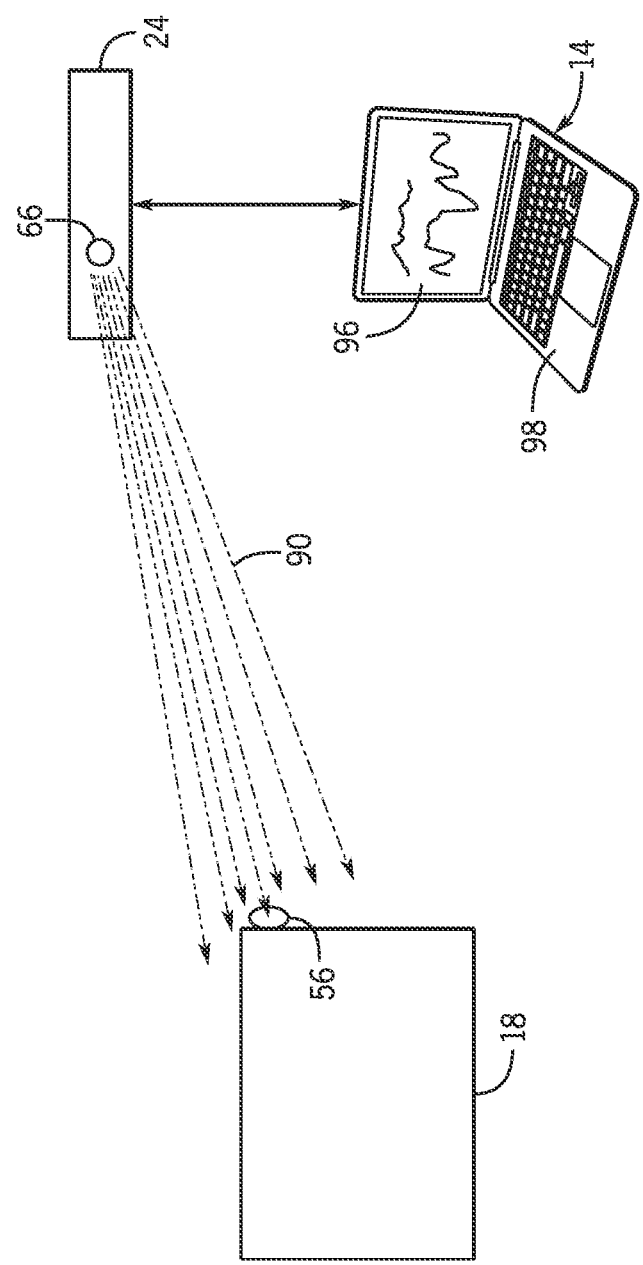
FIG. 5 illustrates an example of selective activation of a shielding device to shield private data of or generated by a user device, in accordance with embodiments described herein.

FIG. 5 is an example of shielding to distort or flood a detected image signal at the sensor 56, depicted here as a camera, of the smart device. In the depicted embodiment, the shielding device 24 includes a light source 66 that, when activated to emit light 90 towards the sensor 56, floods the detected image signal so that any private data that is in the environment, such as displayed private data 96 or user input private data 98 (e.g., keyboard, touch screen entries) of a user device are not resolvable in the acquired image data at the sensor 56. In an embodiment, the light source is sufficiently bright to wash out or flood the sensor 56. That is, the signal generated by the sensor 56 can be generally at the top of the intensity detection scale for the sensor 56 such that any dynamic range of an image that would be resolvable in the absence of the light 90 is no longer present. The detected signal instead is shifted to the top of the detection range. The shielding device 24 is oriented so that the light source 66, when active, is in a direct line of sight to the sensor 56 so that the light 90 impinges the sensor 56. Further, the relative relationship between the shielding device 24 and the sensor 56 is set so that the light 90 that reaches the sensor 56 is sufficiently intense to dominate the acquired image data and shield the private data. The light source 66 may emit visible light and/or light outside of the visible spectrum, depending on the nature of the sensor 56. For example, certain image sensors sense in both the visible and the infrared spectrum. Thus, although the sensor 56 may operate while private data is generated, and pass sensor data to a third party, the ensuing signal generated by the sensor 56 that includes the shielding component cannot be effectively resolved.

The light source 66 is selectively activated as provided herein. In one example, the light source 66 is active while the user device 14 is active or at a password entry screen of the user input device 14. The user device 14 can communicate with the system 10 (e.g., with the data protection tool 16) to cause the light source 66 of the shielding device 24 to be selectively activated in association with particular events, such as activation of a password entry box on a display of the user device 14. Further, the user device 14 can deactivate the light source 66. In an embodiment, the shielding device 24 may also include a user input device to permit a user to manually activate shielding outputs.

Figure 6:
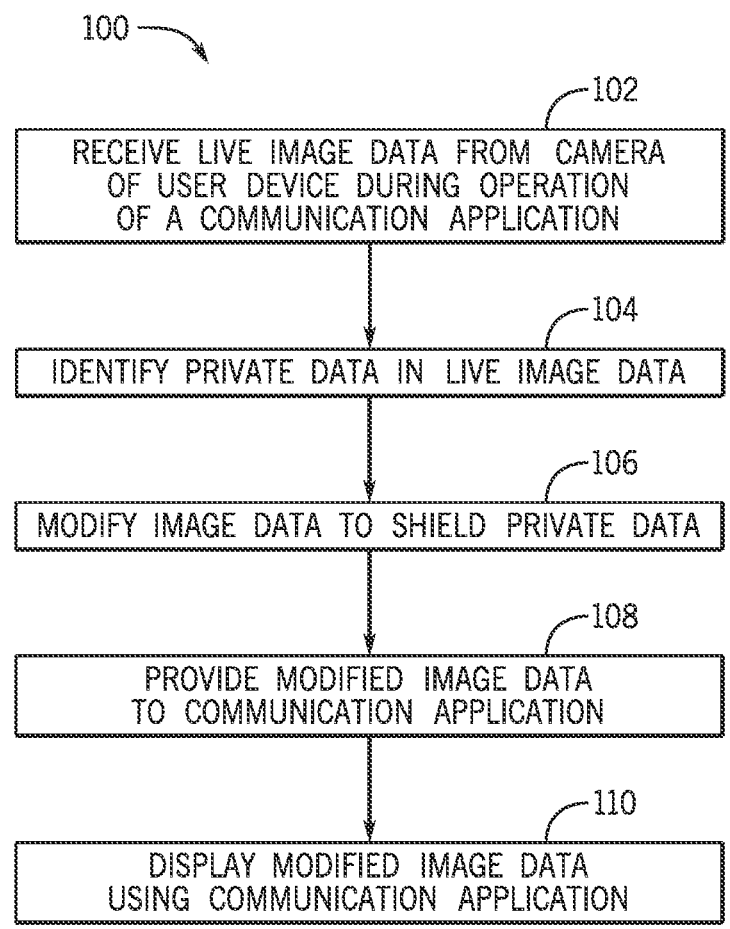
FIG. 6 illustrates a flow diagram of a method for shielding potentially private data visible in a camera feed of a communication tool, in accordance with embodiments described herein.

FIG. 6 is a flow diagram of an embodiment of a process 100 for protecting private data generated by a user device 14. The process 100 may be performed by one or more components of the system 10 and may be at least in part performed by separate components of the system 10. In one example, the process is initiated via interactions of the user with the user device 14. Certain steps of the process 100 may be performed by the data protection tool 16, e.g., running as an application accessed by the interface 38 on the user device 14. The data protection tool 16 may be resident on the server 12, or on a remote server, different than that of server 12.

The data protection tool 16 may also include certain functionality that is accessed and executed in the server 12 or other parts of the system 10 and communicated to the application on the user device 14. Accordingly, as provided herein, steps performed by the data protection tool 16 may generate data that is provided to user device 14 and/or another component of the system 10 in communication with the user device 14. Further, certain operations of the data protection tool 16 may be integrated into or accessed by other applications operating on the user device 14.

The process 100 may be initiated by an indication of private data generation. In one example, the process is initiated upon activation (e.g., operating) of a communication application on the user device 14. Certain communication applications access a camera of the user device 14 to receive live image data, as indicated by block 102.

The process 100 identifies private data that is present in the image data, as indicated in block 104. Artificial intelligence (AI) and machine learning may be used to identify private data captured by the camera (e.g., in the image data) or displayed on an electronic display. For example, the AI may continuously review the data accessed and presented by a computing device, identify structured data and unstructured data, and determine whether the data is sensitive. The structured data may include metadata or some other features that the AI may categorize as sensitive. The unstructured data (including images of people or human parts, images of vault dials, images of documents with labels that indicate the desire for privacy like "confidential", "secret", "classified", etc.), however, may be reviewed according to a machine learning algorithm to assess a score related to whether the unstructured data corresponds to sensitive data. The machine learning algorithm may use previous indications of sensitive data to classify the unstructured data as sensitive. In addition, the machine learning algorithm may review content of unstructured data, such as a spreadsheet, and determine that a column includes sensitive data based on the amount in which a user accesses or uses the data stored in the column to perform certain analyses. In another example, the private data is identified by object recognition algorithms.

The identified private data is shielded by a modification of the image data, as indicated in block 106, and the modified image data is provided to the communication application, indicated in block 108. The communication application can display the modified image data, as indicated in block 110. The modification may be blurring, deletion, masking, replacement, or any other technique obscure the identified private data.

FIG. 7 shows an example of shielded content of the system 10 that may be generated by a user operating the data protection tool 16 in conjunction with, for example, a video conferencing application. During activation of data protection, live camera data, e.g., captured by a camera coupled to the user device 14, is modified to generate a protected output view 150. The protected output view 150 includes unshielded portions and shielded portions. For example, image content that may be potentially private, such as identified books, diplomas, documents, etc., in the image are automatically blurred to generate a modified image by the data protection tool 16. For example, the modified image is provided to the other user in the communication application and, in an embodiment, may also be displayed for reference at the originating user device 14 with a tag 152 to indicate that data protection features are activated.

In one example, AI can recognize and sharpen a user's face 154 in live image data and limit (blur) anything else, such as documents in the background (e.g., a diploma 156). In another example, a default is that the captured image is entirely blurred, and the user is able to clarify selected things or areas by selecting portions or quadrants from which to remove data protection features.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A data protection system to selectively shield private data from a smart device, the system comprising:
    a user device comprising a processor and memory and configured to:
        receive input from a user that the user is generating private data; and
        transmit shielding instructions via the user device responsive to receiving the input that the private data is being generated;
    a smart device comprising a sensor configured to detect environmental data in an environment of the sensor and generate a sensor signal, wherein the sensor comprises a microphone or a camera, and wherein the shielding output is sensed by the sensor when activated; and
    a shielding device, the shielding device comprising a controller that controls activation of a shielding output in response to the shielding instructions from the user device that the private data is being generated, wherein the shielding output is:
        false keyboard signals responsive to keyboard input at the user device as the shielding output or when the sensor comprises the camera, light emitted towards the camera as the shielding output or, when the sensor comprises the microphone, white noise emitted as the shielding output.

2. The system of claim 1, wherein the shielding device is co-located with the smart device.

3. The system of claim 1, wherein the white noise is generated by a white noise generator of the shielding device.

4. The system of claim 1, wherein a shielding output component of the sensor signal is greater than a component of the sensor signal indicative of the private data.

5. The system of claim 4, wherein the shielding output component of the sensor signal comprises a majority of the sensor signal such that the component of the sensor signal indicative of the private data is not resolvable in the sensor signal.

6. The system of claim 1, wherein the shielding device is coupled to or integrated within the user device, wherein the private data comprises keyboard inputs and wherein the shielding output comprises modified keyboard inputs comprising different radio frequency signal or electronic signals relative to the keyboard inputs.

7. The system of claim 6, wherein the shielding output is detected by the sensor.

8. A data protection system to selectively shield private data from a smart device, the system comprising:
    a user device comprising a processor and memory and configured to:
        receive input from a user that the user is generating private data; and
        transmit shielding instructions via the user device responsive to receiving the input that the private data is being generated;
    a smart device comprising a sensor, wherein the sensor comprises a microphone or a camera, and wherein the shielding output is sensed by the sensor when activated and;
    a shielding device coupled to the user device, the shielding device comprising a controller that emits a signal to the smart device in response to the shielding instructions, wherein the smart device deactivates the sensor in response to receiving the signal, wherein the shielding output comprises
        false keyboard signals responsive to keyboard input at the user device; or
        white noise when the sensor comprises the microphone; or
        emitted light emitted towards the camera when the sensor comprises the camera.

9. The system of claim 8, wherein the shielding instructions are automatically transmitted based on a communication application on the user device being active.

10. The system of claim 9, wherein the communication application sends a signal indicative of the activity to a data protection tool operating on the user device, and wherein the data protection tool generates the shielding instructions.

11. The system of claim 8, wherein the signal is activated based on detection of a password or phrase by the shielding device or by the user device.

12. The system of claim 8, wherein the signal is activated based on identification of a type of the input being associated with the private data, wherein the identification is performed by a data protection tool operating on the user device, and wherein the data protection tool generates instructions to emit the signal.

13. The system of claim 1, wherein the user device transmits the shielding instructions upon connection with an active headset.

14. The system of claim 1, wherein the shielding device is integrated into the user device.

15. The system of claim 1, wherein the false keyboard signals output by the shielding device comprise different radio frequency signals than the keyboard input.

* * * * *